United States Patent
Hanes et al.

(10) Patent No.: US 6,813,725 B1
(45) Date of Patent: Nov. 2, 2004

(54) METHOD FOR RESTORING AN OPERATING SYSTEM UTILIZING A STORAGE DEVICE ON A USB BUS

(75) Inventors: David H Hanes, Loveland, CO (US); Stephen F Bayless, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/491,246

(22) Filed: Jan. 26, 2000

(51) Int. Cl.$^7$ ................................................ G06F 11/00
(52) U.S. Cl. ................................................ 714/2; 710/63
(58) Field of Search .............................. 714/2, 10, 13, 714/15, 16, 23, 43, 44, 56; 710/8, 15, 17, 63, 100

(56) References Cited

U.S. PATENT DOCUMENTS

| | | | | | |
|---|---|---|---|---|---|
| 5,841,424 | A | * | 11/1998 | Kikinis | 345/168 |
| 5,896,534 | A | * | 4/1999 | Pearce et al. | 710/17 |
| 6,070,204 | A | * | 5/2000 | Poisner | 710/100 |
| 6,085,265 | A | * | 7/2000 | Kou | 710/63 |
| 6,389,560 | B1 | * | 5/2002 | Chew | 714/43 |

* cited by examiner

Primary Examiner—Dieu-Minh Le

(57) ABSTRACT

A method and system for enabling a computer application that executes in an environment in which support for USB does not exist (e.g., in the DOS environment) to interact with a USB storage device. In a most preferred embodiment, a system and method is disclosed for restoring a computer system from a storage device on a USB utilizing a disaster recovery application that executes in DOS.

20 Claims, 1 Drawing Sheet

METHOD FOR RESTORING AN OPERATING SYSTEM UTILIZING A STORAGE DEVICE ON A USB BUS

TECHNICAL FIELD

The present invention relates in general to a computer application executing in a real-mode environment, such as DOS, on a computer system and interacting with a USB storage device coupled to the computer system, and in particular to performing a disaster recovery for a computer system operating in a DOS environment from a USB storage device.

BACKGROUND

It is common today for users to utilize personal computers (e.g., IBM PCs or an imac) that have an operating system, such as Microsoft Windows or DOS, executing thereon. Often, users buy a storage device to perform backups to save the state of their systems because, should some disastrous event (such as a crash, virus, etc.) occur, then the operating system can be restored. Present day attempts at such backup applications involve software like that marketed under the trademark Backup Exec, owned by Veritas Corporation, that can essentially back up all files from a user's hard drive onto a storage device, such as a CD Re-Writeable (CDRW) drive. In conjunction with such a system, the backup application will create a "boot" floppy, for cases where a user has some catastrophic failure such as where the hard drive fails, etcetera. When provided for in this manner, the user can boot up off the floppy (which itself typically boots into a DOS operating system) and then run a DOS application provided by the backup vendor to restore the hard drive contents. This so-called disaster recovery application will retrieve data (e.g., files) off the storage device (e.g., a CDRW drive) and restore it to the user's hard drive so that one can thereafter boot back up off of the hard drive and return the system to normal.

The problem with this type of disaster recovery is that the industry is moving toward Universal Serial Bus (USB) storage devices (e.g., USB versions of CDRW drives). USB is a well-known external bus standard that typically supports data transfer rates of 12 Mbps (12 million bits per second). A single USB port can be used to connect dozens of peripheral devices such as mice, modems, keyboards, and storage devices to a computer. Many people anticipate that USB will eventually replace serial and parallel ports that are commonly found in present-day computer systems. Because of the advantages offered by USB and the increasing implementation of USB within computer systems, it is desirable to allow users to perform a disaster recovery of a computer system from a storage device connected to the computer system via USB.

However, when a user boots a computer system (e.g., a PC, notebook computer, or any other type of computer system) from a disaster recovery floppy, such computer system is running in a DOS operating system environment, where support for USB does not exist. As such, users are limited within a DOS operating system environment, as a disaster recovery application executing in DOS cannot communicate with a USB storage device to retrieve files from the storage device in order to restore such files back to the computer's hard drive. Essentially, under prior art solutions, one cannot perform a disaster recovery if the storage device is on a USB, and the disaster recovery application utilizes a DOS operating system environment.

Additionally, instances other than the above-described disaster recovery exist wherein an application may execute in a real-mode environment in which USB is not supported, such as DOS, and such application may desire to interact with a USB storage device. In the prior art, such application would not be capable of interacting with a USB storage device as desired. For instance, an application may be designed to execute in a DOS environment (or other environment in which USB is not supported) and may interact with one or more USB storage devices, such as a CDRW drive, a DVD drive, other optical storage devices, a ZIP drive, a SuperDisk drive (e.g., as developed by Imation Corporation), a floppy drive, a high floppy (HiFD) disk drive (e.g., as developed by Sony), a rotating magnetic storage device, and a sequential tape storage device. However, the application may be installed on a computer system in which such storage devices are coupled to the computer system via a USB port. Thus, the application designed to execute in a DOS environment may be incapable of interacting with the desired USB storage devices.

SUMMARY OF THE INVENTION

In view of the above, there is a desire for a system and method that allow a computer application that executes in an environment in which USB is not supported (e.g., DOS) to interact with USB storage devices. A further desire exists for a system and method for restoring a computer system from a USB storage device. More specifically, a desire exists for a system and method that allow a disaster recovery to be performed for a computer system from a USB storage device, wherein the disaster recovery application executes in an environment in which support for USB does not exist (e.g., in DOS).

These and other objects, features and technical advantages are achieved by a system and method for enabling a computer application that executes in an environment in which USB is not supported (e.g., DOS) to interact with USB storage devices. For example, a system and method is disclosed for restoring a computer system from a storage device on a USB. In order to effectuate the above, a preferred embodiment of the present invention provides support for a DOS environment such that a user is able to utilize a disaster recovery application which works with a USB type storage device. A USB type storage device includes but is not limited to the following types of storage devices coupled to a computer via USB: a CD drive (e.g., a Hewlett-Packard type CDRW drive), a DVD drive, other optical storage devices, a ZIP drive, a SuperDisk drive (e.g., as developed by Imation Corporation), a floppy drive, a high floppy (HiFD) disk drive (e.g., as developed by Sony), a rotating magnetic storage device, and a sequential tape storage device.

In so providing, a preferred embodiment contemplates implementation of a driver that provides full feature functionality for controlling the USB hardware. The driver is written such that existing disaster recovery applications need not change and need not involve support from a third party (e.g., need not involve a special USB version of a disaster recovery application). Thus, a preferred embodiment can utilize an existing disaster recovery application, yet make such application appear seamless such that it will appear that it is operating with a Small Computer System Interface (SCSI) device or Enhanced Integrated Drive Electronics (EIDE) device, e.g., AT Attachment Packet Interface (ATAPI) device. In actuality, however, the application is really operating across the USB. Such provision further allows the user to connect to more primitive systems if needed, and even to connect in arcane cases where, for example, a Microsoft logo requirement is used on CD ROM manufacturers, which would necessarily require installation of a Windows operating system from the device on a bare machine.

Furthermore, the disclosure is enabling for applications other than disaster recovery applications to interact with USB storage devices. Thus, in a most preferred embodiment, a real-mode driver is implemented to allow a computer application executing in an environment in which USB is not supported (which may or may not be a disaster recovery application) to interact with a desired USB storage device.

It should be appreciated that a technical advantage of one aspect of the present invention is that a system and method for enabling a computer application that executes in an environment, in which support for USB does not exist, to interact with desired USB storage devices. It should further be appreciated that a technical advantage of one aspect of the present invention is that a system and method for restoring a computer system from a USB storage device are provided. A further technical advantage of one aspect of the present invention is that such a disaster recovery from a USB storage device may be accomplished utilizing an existing disaster recovery application that executes in an environment in which USB is not supported (e.g., the DOS environment). Accordingly, a special-purpose USB disaster recovery application is not required to accomplish a disaster recovery from a USB storage device. Thus, as an example of a preferred embodiment, a user may create a backup of a computer system on a USB storage device and have the capability of performing a disaster recovery from the USB storage device utilizing any disaster recovery application that executes in a DOS environment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

A preferred embodiment of the present invention implements a real-mode driver, which enables a computer application executing in an environment in which USB is not supported (e.g., DOS) to interact with desired USB devices. In a most preferred embodiment, the computer application is a disaster recovery application which interacts with a USB storage device. Although, in alternative embodiments, the real-mode driver may be implemented to enable any type of computer application that executes in an environment in which USB is not supported to interact with USB storage devices, as desired, and any such embodiment is intended to be within the scope of the present invention. Thus, while the below disclosure is directed toward the specific embodiment of a disaster recovery application interacting with a USB storage device, such description of that specific embodiment is intended to render the disclosure enabling for any other type of computer application (that executes in an environment in which support for USB does not exist) that desires to interact with any type of USB storage device.

Figure 1:
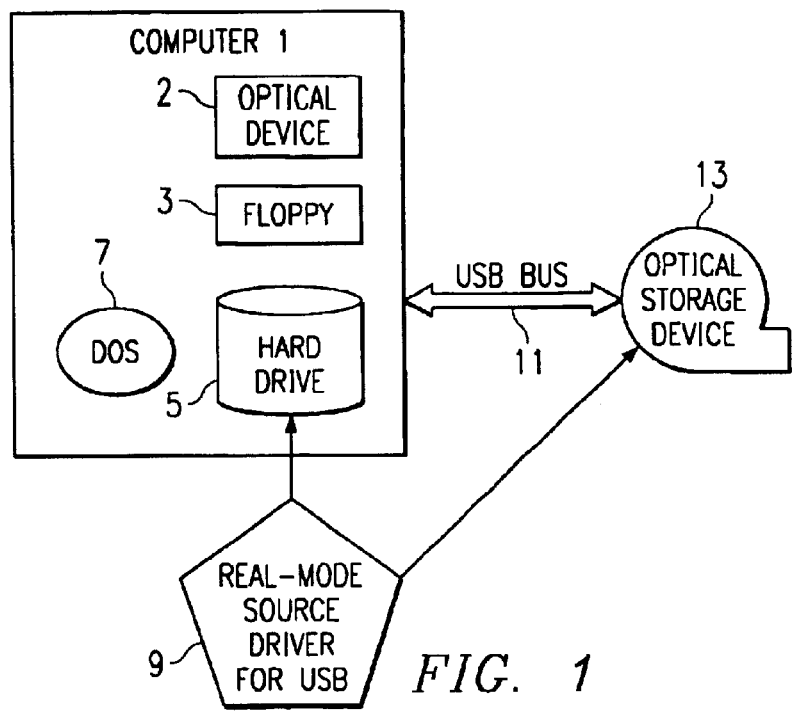
FIG. 1 depicts a schematic representation of a computer system that may utilize a preferred embodiment of the present invention.

The present invention contemplates utilization of a real-mode driver which, according to several embodiments might implement multiple interfaces to it. Interfaces are needed to connect the driver because a common language is needed between drivers and host adapters. Preferably, as seen in FIG. 1, the real-mode driver 9 would initially be a part of the installed software package for the application (e.g., a backup application), which may be installed from an optical storage device 13 (e.g., CDRW drive or writeable DVD device), which is connected to computer 1 via USB 11. It should be understood that while a preferred embodiment is described with reference to an optical storage device 13, the scope of the present invention is not intended to be limited to only optical storage devices. Rather, any type of USB storage device may be implemented within a system, and any such implementation is intended to be within the scope of the present invention. In order to initiate the program, the user would install the backup application and real-mode driver 9 would, preferably, be copied onto the hard drive 5 of computer 1 at that time.

When the backup application is invoked, it can create a disaster recovery floppy disk 3, during which the real-mode driver would be copied onto such disaster recovery disk. The real-mode driver would be specified via some configuration files on the floppy 3 to load when the user boots computer 1 from floppy 3. When the user boots computer 1 off floppy 3, real-mode driver 9 would be loaded into memory at which point it would be used only during the restore/disaster recovery. Accordingly, in a preferred embodiment, real-mode driver 9 is not invoked from user hard drive 5, but rather is invoked directly from floppy disk 3.

In an alternative embodiment, however, the present invention could similarly provide for a bootable optical disc (e.g., a bootable CD) on optical storage device 13 that has DOS 7 (here, pictured on computer 1) so that a user could potentially boot computer 1 off of the bootable optical disc directly. It should be noted, however, that the computer system may not boot from USB optical storage device 13 without a USB aware BIOS (basic input/output system). Although, the computer system may boot from another storage device (e.g., another optical storage device, such as a CD-ROM drive) that interfaces with the computer system using SCSI or ATAPI, as examples. Such provision allows a user to make a CD, for example, that one can put into a drive (e.g., optical device 2) and actually boot up off of the CD (instead of a hard drive or a floppy). Thus, allowance is made for one embodiment of the present invention to interact with a bootable optical disc such as needed in cases where one actually causes the backup of computer 1 to be stored on an optical disc in order to make such optical disc bootable for disaster recovery. For example, in one embodiment, real-mode driver 9 would be shipped on an installation CD and then preferably installed through the hard drive of a computer, and thereafter moved to a bootable optical disc which would be created when the user invokes a backup application, much like a floppy disk 3 but on a different media.

Figure 2:
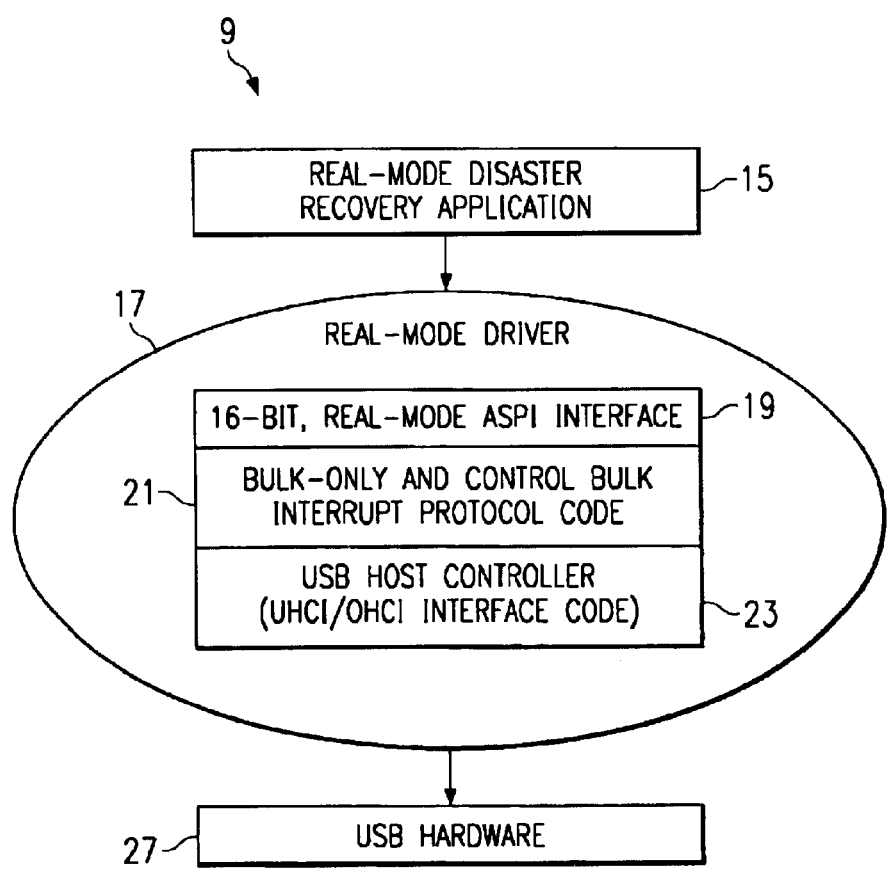
FIG. 2 is a schematic representation of the higher-level architecture of a preferred embodiment of the present invention.

Referring to FIG. 2, the real-mode driver 17 is a single driver that consists of three layers of functionality. The top layer 19 in a preferred embodiment would utilize an Advanced SCSI Programming Interface (ASPI) such as that from Adaptec Inc., of Milpitas, Calif. (USA) having a 16-bit DOS ASPI type interface. The use of ASPI will preferably interface well with existing backup/disaster recovery applications.

The protocol layer 21 supports existing USB mass storage protocols, including "Bulk Only" and "Control Bulk Interrupt" (CBI) protocols (both of which are protocols well known within the relevant art). Additionally, it should be understood that protocol layer 21 can be implemented as needed to support any USB mass storage protocol, including protocols developed in the future, and any such implementation is intended to be within the scope of the present invention.

The USB Host Controller Layer 23 includes code for controlling USB hardware. Preferably, USB Host Controller Layer 23 supports existing USB host controller hardware, including the "Universal Host Controller Interface" (UHCI) and/or the "Open Host Controller Interface" (OHCI). Both UHCI and OHCI are existing, well known specifications. It should be understood that the USB Host Controller Layer 23 can be implemented as needed to support any now known or future developed USB hardware, such as the USB 2.0 proposal, and any such implementation is intended to be within the scope of the present invention.

It should be understood that one embodiment of the present invention might provide for common sorts of routines in the system that would work for either UHCI or OHCI, depending on which might be desirable, according to the required application. By way of example, if a user were involved with a task, such as manufacturing line implementation, and if the user happened to know that the industry standard was to use UHCI, the user could then tailor the driver to utilize UHCI, and vice-versa. For disaster recovery, it is desirable that the real-mode driver work on a broad range of computers, so in the most preferred embodiment, the present invention would support both types of interfaces, and may also be configured to support any other interfaces now known or later developed.

With continuing reference to FIGS. 1 and 2, real-mode driver 17 receives a command or request from the real-mode disaster recovery application 15 that communicates through ASPI interface 19. In a preferred embodiment, the ASPI command contains a "SCSI Request Block" (SRB). The SRB is a data structure which essentially defines a command to perform some transfer of data or status from the computer 1 to the storage device 13 or from the storage device 13 to the computer 1. It should be recognized that generally there are some ASPI commands that do not contain a SRB, and a preferred embodiment is intended to encompass such ASPI commands that do not contain a SRB data structure, as well. In a preferred embodiment, the ASPI interface layer 19 validates the contents of the SRB and passes the command to the protocol layer 21. The protocol layer 21 translates the SRB into the appropriate USB mass storage protocol (e.g., Bulk-only or CBI) or other appropriate USB device protocol. The USB host controller layer 23 then transfers the translated command to the USB hardware 27 (e.g., storage device 13) over the USB 11.

In a preferred embodiment, after the SRB is implemented, the system specifies that within the SRB there exists another data structure called a Command Data Block (CDB), which is a command that needs to be sent to the USB device. As such, the SRB may be implemented as a type of large scale global structure that includes a CDB as a part of the SRB. The system and method 9 will then take that command through bulk only or control bulk interrupt protocol code 21, and send it to the USB device using the USB host controller layer 23. Once the CDB is received by the USB device via the USB, the USB device (e.g., device 13) would process the CDB. The USB device then sends data and/or status information back across the USB to the real-mode driver 17. It should be understood that the real-mode driver 17 may be implemented such that it is capable of processing certain CDBs without requiring such CDBs to actually be sent to the USB device 13.

It should be understood that while in a preferred embodiment, the real-mode driver is utilized only for disaster recovery purposes, in alternative embodiments, it may also be utilized for other purposes, e.g., to allow any other application that executes in an environment in which support for USB does not exist (e.g., DOS) to interact with a USB storage device. Thus, while the preferred embodiment has been discussed above with reference to a disaster recovery application interacting with a USB storage device, the scope of the present invention is not intended to be so limited. Alternative embodiments may be implemented to allow any type of computer application that executes in an environment in which support for USB does not exist (e.g., DOS) to interact with any type of USB storage device, and any such implementation is intended to be within the scope of the present invention. Therefore, the above-described embodiment implemented to allow interaction between a disaster recovery application and a USB storage device is intended as an example that renders the disclosure enabling for many other types of applications executing in an environment in which support for USB does not exist (e.g., DOS) that may interact with any type of USB storage device.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for providing communication between a computer application executing in a real-mode environment and a USB storage device, said system comprising:

a computer system including a storage means and a processing means;

a computer application capable of being executed utilizing said processing means, wherein said computer application executes in a real-mode environment in which USB is not supported;

a USB storage device coupled to said computer system; and a real-mode driver operable to enable communication between said computer application executing in said real-mode environment and said USB storage device.

2. The system of claim 1, wherein said storage means is selected from the group consisting of a hard drive, a floppy drive, an optical drive, RAM, SDRAM, and ROM; and wherein said processing means is a CPU.

3. The system of claim 1, wherein said computer application is a disaster recovery application.

4. The system of claim 1, wherein said USB storage device is a device selected from the group consisting of:

CDRW drive, a DVD drive, any other optical storage device, a ZIP drive, a SuperDisk drive, a floppy drive, a high floppy (HiFD) disk drive, any type of rotating magnetic storage device, and any type of sequential tape storage device.

5. The system of claim 1, wherein said real-mode environment is the DOS operating environment.

6. A system for providing real-mode USB support for a disaster recovery application executing in a real-mode environment to allow a disaster recovery from a USB storage device which utilizes USB protocols, said system comprising:

a computer system including a storage means and a processing means;

a USB mass storage device coupled to said computer system;

a real-mode disaster recovery application executable by said processing means to recover data for said computer system, wherein said real-mode disaster recovery application is executable in an environment in which USB is not supported; and a real-mode driver operable to enable communication between said disaster recovery application and said USB mass storage device to allow a disaster recovery to be accomplished by said disaster recovery application from said USB mass storage device.

7. The system of claim 6, further comprising:

said real-mode driver having a real-mode ASPI interface for providing mass storage protocols that enable interoperability of said real-mode disaster recovery application with said USB mass storage device for restoration of an operating system from said mass storage device.

8. The system of claim 7, wherein the real-mode ASPI is a 16-bit interface.

9. The system of claim 7, wherein said real-mode driver further comprises Bulk-only and Control Bulk Interrupt Protocol Code, and USB hardware control code.

10. The system of claim 7, wherein said real-mode driver further comprises UHCI/OHCI code.

11. The system of claim 6, wherein said storage means is selected from the group consisting of a hard drive, a floppy drive, an optical drive, RAM, SDRAM, and ROM; and wherein said processing means is a CPU.

12. The system of claim 6, wherein said USB mass storage device is a device selected from the group consisting of:

CDRW drive, a DVD drive, any other optical storage device, a ZIP drive, a SuperDisk drive, a floppy drive, a high floppy (HiFD) disk drive, any type of rotating magnetic storage device, and any type of sequential tape storage device.

13. The system of claim 6, wherein said real-mode environment is the DOS operating environment.

14. A method for providing real-mode USB support for a computer application executing in a real-mode environment to enable communication between the computer application and a USB mass storage device which utilizes mass storage USB protocols, said method comprising:

executing a computer application in a real-mode environment of a computer system in which USB is not supported;

providing a USB storage device coupled to said computer system, wherein said USB mass storage device contains data desired by said computer application; and utilizing a real-mode driver to enable communication between said computer application executing in a real-mode environment and said USB mass storage device such that said computer application may retrieve said desired data from said USB mass storage device.

15. The method of claim 14, wherein said computer application is a disaster recovery application and said desired data is data for restoring an operating system for said computer system from said USB mass storage device.

16. The method of claim 15, further comprises:

saving backup data from said computer system to said USB mass storage device; and executing said disaster recovery application to recover said backup data from said USB mass storage device to said computer system.

17. The method of claim 14, wherein said real-mode driver is implemented within at least one of said computer application and said USB mass storage device.

18. The method of claim 14, further comprising:

utilizing said real-mode driver to render an ASPI interface for providing mass storage protocols that enable interoperability of said computer application with said USB mass storage device.

19. The method of claim 14, wherein said USB mass storage device is a device selected from the group consisting of:

CDRW drive, a DVD drive, any other optical storage device, a ZIP drive, a SuperDisk drive, a floppy drive, a high floppy (HiFD) disk drive, any type of rotating magnetic storage device, and any type of sequential tape storage device.

20. The method of claim 14, wherein said real-mode environment is the DOS operating environment.

* * * * *